F. STEBLER.
APPARATUS FOR REMOVING OBJECTS FROM A LIQUID BODY.
APPLICATION FILED JULY 13, 1921.
1,430,198.
Patented Sept. 26, 1922.
2 SHEETS—SHEET 1.
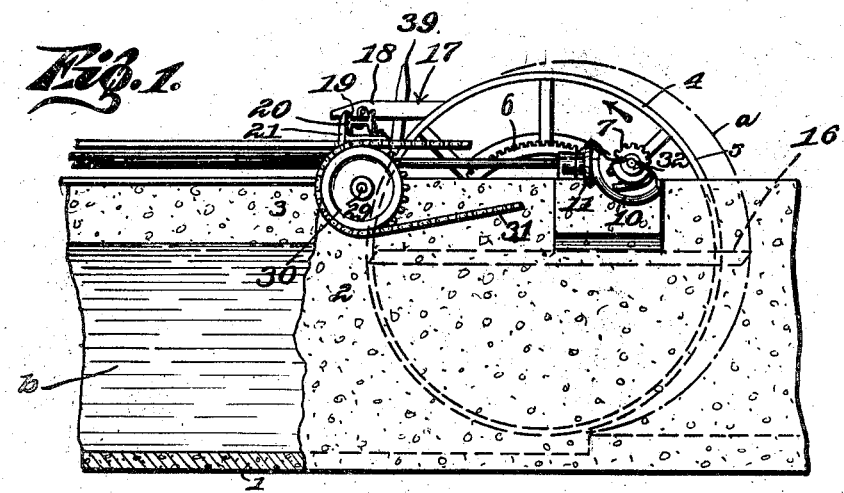
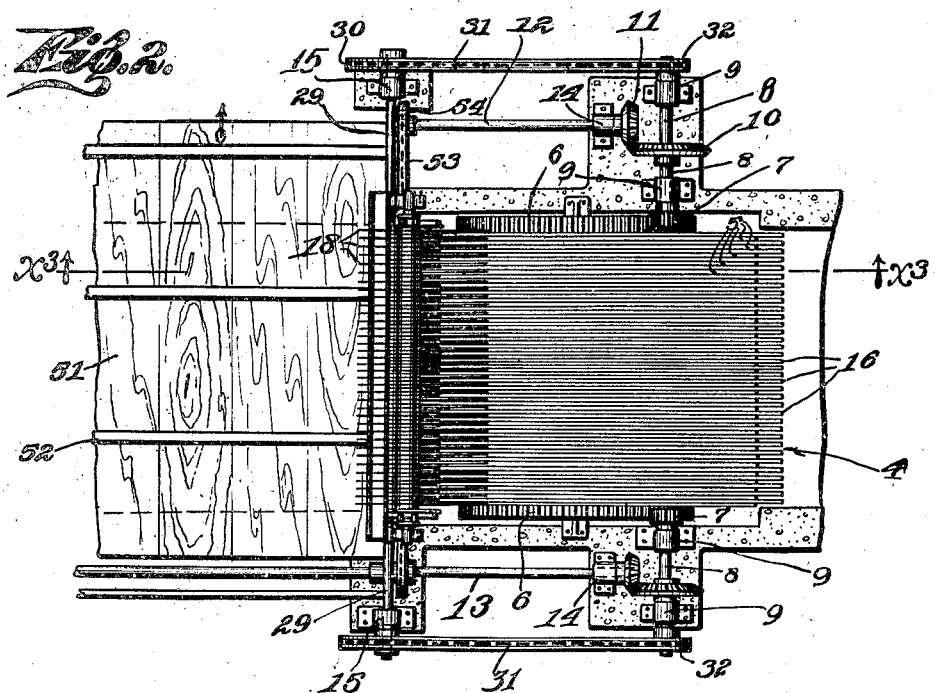
INVENTOR.
Fred Stebler
BY
ATTORNEY.

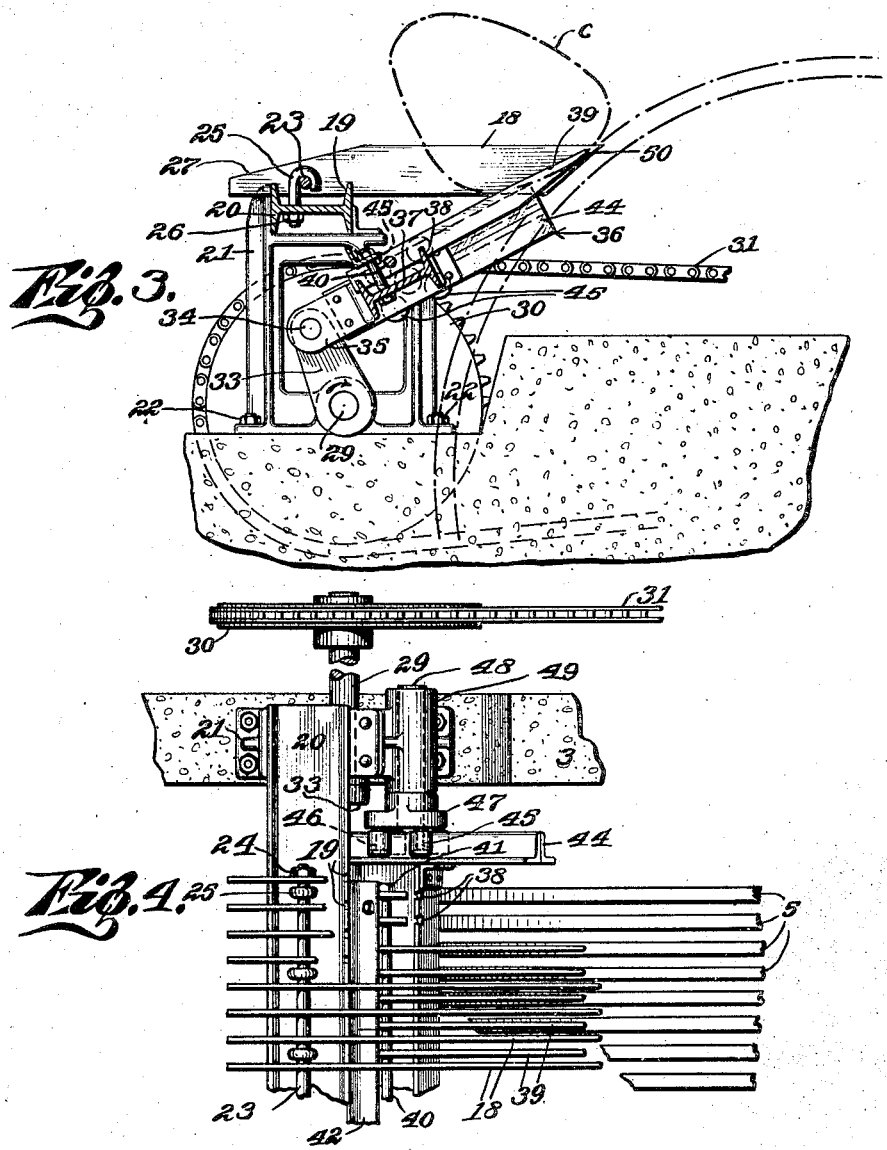

Patented Sept. 26, 1922.

1,430,198

UNITED STATES PATENT OFFICE.

FRED STEBLER, OF RIVERSIDE, CALIFORNIA.

APPARATUS FOR REMOVING OBJECTS FROM A LIQUID BODY.

Application filed July 13, 1921. Serial No. 484,305.

*To all whom it may concern:*

Be it known that I, FRED STEBLER, a citizen of the United States, and a resident of Riverside, in the county of Riverside and State of California, have invented certain new and useful Improvements in Apparatus for Removing Objects from a Liquid Body, of which the following is a specification.

This invention relates to an apparatus adapted to be installed in a stream or other liquid body for removing objects therefrom and is an improvement on the apparatus disclosed in the application of Francis Cuttle for Patent, Serial No. 412,087, filed September 22, 1920, in which application I have been assigned a one-half interest.

This apparatus may be used for divers purposes. One use of the apparatus is for the removal of débris from an irrigation ditch or channel, and when so used it also constitutes a fish screen to prevent the passage of fish into the irrigation channels from the natural stream in which it is desirable that they remain. The apparatus is also useful in removing fruit or other bodies from a tank in which they are placed. The latter use is especially serviceable in the citrus fruit industry.

In using the prior apparatus, noted above, especially in the use of said apparatus for removing débris from irrigation channels, moss and other more or less sticky substances adhere to the surface of the drum and work in under the discharge chute, which is a stationary member bridging the space between the drum and a transverse slat conveyer. The moss and other débris picked up by the drum are to a large extent deposited on the chute and pile up upon the chute adjacent the periphery of the drum, thus increasing the probability of the débris working between the chute and the drum.

An object of the present invention is to detach matter that may adhere to the drum and work the débris off of the chute as fast as it is deposited thereon so that the difficulties mentioned in the preceding paragraph will be overcome.

A further object of the invention is to effect the removal of the débris from the drum and platform, on which it is deposited, by the raking action of a plurality of fingers interposed between spaced slats constituting the platform.

The accompanying drawings illustrate the invention:

Figure 1 is a side elevation of an apparatus built in accordance with the provisions of this invention, the fluid container or channel-forming means being fragmentarily shown.

Figure 2 is a plan view of Figure 1.

Figure 3 is an enlarged fragmental elevation partly in section on line indicated by $x^3$—$x^3$, Figure 2.

Figure 4 is a plan view of Figure 3.

The liquid container may be, for example, a natural or artificial stream bed or may be artificially formed as indicated in the drawings, in which the bottom is indicated at 1 and the sides at 2, 3. A rotary drum 4 is provided in the container. The drum may be made of any suitable material and, if intended to permit liquid to flow therethrough as when it functions as a screen to prevent the passage of fish, the drum may be in the form of a screen and, in the instance shown in the drawings, the drum comprises a series of spaced bars in the form of rings 5, thus making the drum permeable to liquids. The remainder of the construction of the drum has no bearing upon the present invention and the details of its construction are set forth in the aforementioned application.

In the present instance the driving connections for the drum are as follows: Fixed to the hubs of the drum are spur gears 6 engaged by pinions 7 on shafts 8. The shafts 8 are journaled in bearings 9 mounted on the sides of the liquid container and said shafts are provided with miter gears 10 driven by miter gears 11 on shafts 12 and 13, respectively. The shafts 12, 13 are journaled in bearings 14, 15 mounted on suitable supports. In the application mentioned above, the drum is driven by an under-shot water wheel operated by the liquid stream in which the apparatus is placed, and this present apparatus may be driven in the same manner or by any other suitable means. The driving power may be applied through the shaft 13, of which only a fragment is shown in the drawings.

The drum is provided diametrically thereof with a series of rake teeth 16 which are interposed between the bars of the drum. The teeth 16 may be caused to move in and out between said bars and such movement may be effected by any suitable mechanism. One type of such mechanism is disclosed in detail in the hereinbefore mentioned prior invention and those skilled in this art are familiar with mechanism of this character and it is, therefore, unnecessary to describe such mechanism in detail herein, it forming no part of the present invention. It is sufficient to state that the outer ends of the teeth 16 describe the path $a$ indicated in Figure 1, as the drum is rotated. Thus the teeth 16 pick up objects in the liquid body $b$ and carry said objects on to a platform indicated in general at 17.

The platform 17 comprises a series of spaced slats 18 in staggered relation with the drum rings 5 and mounted in notches 19 in the flanges of an I-beam 20. The end portions of the I-beam 20 rest upon standards 21 secured by bolts 22 to the opposite sides of the liquid container. Passing through the slats 18 between the flanges of the I-beam is a rod 23 and the end of the rod is provided with nuts 24 bearing against the outer faces of the endmost slats 18. At intervals along the rod 23 are hook bolts 25 which pass through the I-beam 20 and which are secured thereto by nuts 26, thus holding the slats 18 securely fastened to the I-beam. The free ends of the slats 18 are beveled as indicated at 27 so as to substantially conform with the peripheral curve of the drum. The slats 18 preferably project between adjacent drum rings 5 so as to prevent débris on the surface of the drum from passing the slats as the drum rotates.

The lower portions of the standards 20 form bearings 28 in which are journaled stub shafts 29 that are provided at their outer ends with sprocket wheels 30 engaged by sprocket chains 31. The sprocket chains 31 are driven by sprocket wheels 32 mounted on the opposite ends of the shaft 8. The shafts 29 are provided with crank arms 33 having their crank pins 34 engaging bearings 35 of a rake indicated in general at 36. The rake comprises a transversely extending I-beam 37 having notches 38 in its flanges to receive edgewise the rake teeth 39. Passing through the rake teeth 39 is a rod 40 held in place by nuts 41 screw-threaded onto the ends of said rods against the outer faces of the endmost rake teeth. Extending parallel with the I-beam 37 and positioned on the upper edges of the rake teeth 39 is an angle iron 42, which is securely held in place by bolts 43 passing through the angle irons and through the web of the I-beam. The angle iron 42 thus prevents the rake teeth 39 from coming out of the notches 38. The relative arrangement of the rake teeth 39 and slats 18 is such that the rake teeth project between adjacent slats and are alined with the drum rings 5. The free ends of the rake teeth 39 are tapered or pointed as indicated at 50.

The I-beam 38 is provided at its opposite ends with T-shaped guides 44 arranged at right angles to the I-beam and each of the guides 44 is interposed between two sets of rollers 45 which are journaled on studs 46 projecting from the inner face of a collar 47. The collars 47 are rotatively mounted by studs 48 journaled in bearings 49 which are formed in the upper portions of the standards 20. Thus the guides 44, rollers 45, collars 47, studs 48 and bearings 49 constitute means shiftably and pivotally supporting the rake 36.

Adjacent the discharge end of the platform 16 is a transversely operating slat conveyer comprising a table 51, slats 52 and a sprocket chain 53 running over sprocket wheels 54 on the shafts 12, 13, respectively.

The operation of the apparatus may be briefly described as follows: Power will be applied to drive the shaft 13, thus rotating the drum 4 with its rake teeth 16, and also operating the conveyer slats 52 and the shafts 29. Arrows adjacent the parts just mentioned indicate the direction of movement of said parts. The rake teeth 16, as the drum turns, engage the objects floating in the liquid $b$ and carry said objects toward the platform 17, of which the slats 18 function to strip off moss and other clinging substances so as to cause the material picked up to pile up on the forward ends of the slats 18.

The shafts 29 are driven considerably faster than the drum and, because of the cranks 33, guides 44 and rollers 45, the forward ends of the rake teeth 39 are caused to travel in the irregular curved path $c$ indicated by a dot-and-dash line in Figure 3. The path $c$ comprises a forwardly and upwardly slanting limb lying adjacent to the periphery of the drum, a rearwardly and upwardly slanting limb and a forwardly and downwardly slanting limb. As the teeth 39 move in the first limb mentioned, they thrust between the débris and the periphery of the drum, and as they move in the second limb they push or throw the débris rearwardly from the drum. In the third limb of their movement, the teeth 39 let the débris fall free of said teeth. It is to be noted that maximum horizontal motion of the forward ends of the teeth 39 occurs while the cranks 35 have an angular movement of only approximately ninety degrees. Thus a definite tossing or pitching action is given the teeth 39 so as to tend to throw the débris clear of the platform 17 and onto the table 51 whence the slats 52 operate to scrape the débris to one side of the apparatus.

Any material that may tend to stick to the rake teeth 39 will be stripped therefrom by the slats 18 as said teeth pass on the third limb of their movement, and said material thus deposited on the slats 18, as it accumulates, will be gradually pushed off of said slats onto the platform by the repeated backward strokes of the teeth 39.

The invention is not limited to the exact details of construction disclosed in the drawings and herein described, but it is understood that such changes and modifications may be made as lie within the spirit and scope of the appended claims.

I claim:

1. In an apparatus of the character described, rotary means to remove objects from a liquid body, a platform adjacent the rotary means and means operating to intermittently pitch the objects from said platform.

2. In an apparatus of the character described, rotary means to remove objects from a liquid body, a platform adjacent the rotary means, a conveyer, means to operate the conveyer, and means operating between the rotary means and the conveyer to intermittently pitch the objects from the platform onto the conveyer.

3. In an apparatus of the character described, rotary means to pick objects from a liquid body, and means moving alternately toward and from the rotary means in an irregular path to rake away the objects from adjacent the periphery of the drum.

4. In an apparatus of the character described, rotary means to pick objects from a liquid body, a conveyer, means to operate the conveyer, and means moving alternately toward and from the rotary means in an irregular path to rake the objects from adjacent the periphery of the drum onto the conveyer.

5. In an apparatus of the character described, rotary means to pick objects from a liquid body, a platform comprising slats positioned adjacent the rotary means, and means operating in an irregular path toward and from the rotary means between adjacent slats to rake the objects away from the rotary means as the rotary means deposits them on the slats.

6. In an apparatus of the character described, rotary means to pick objects from a liquid body comprising spaced rings, a platform comprising slats projecting between adjacent rings, and means operating in an irregular path toward and from the rotary means between adjacent slats to rake the objects away from the rotary means as the rotary means deposits them on the slats.

7. In an apparatus of the character described, rotary means to pick objects from a liquid body, a platform comprising slats positioned adjacent to the rotary means, a rake having teeth projecting between adjacent slats, a shifting pivotal mounting for the rake, and means to move the rear end of the rake in a rotary path.

8. In an apparatus of the character described, rotary means to pick up objects in a liquid body, slats adjacent the rotary means, a rake having its teeth projecting between adjacent slats, and means operating to move the forward ends of the rake teeth aslant forward and upward adjacent the rotary means, thence aslant rearward and upward and thence aslant downward and forward.

Signed at Los Angeles, California, this 6th day of July, 1921.

FRED STEBLER.

Witnesses:
 GEORGE H. HILES,
 L. BELLE WEAVER.